(12) United States Patent
Zheng et al.

(10) Patent No.: US 9,436,494 B2
(45) Date of Patent: *Sep. 6, 2016

(54) PRESERVING AN INDEPENDENT VIRTUAL DISK

(71) Applicant: VMware, INC., Palo Alto, CA (US)

(72) Inventors: Yufeng Zheng, San Jose, CA (US); Xiaopeng Zhang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/830,209

(22) Filed: Mar. 14, 2013

(65) Prior Publication Data
US 2014/0282511 A1 Sep. 18, 2014

(51) Int. Cl.
*G06F 9/455* (2006.01)

(52) U.S. Cl.
CPC . *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,810,092 B1 * | 10/2010 | van Rietschote et al. | 718/1 |
| 2009/0228649 A1 * | 9/2009 | Porel et al. | 711/114 |
| 2010/0070978 A1 | 3/2010 | Chawla et al. | |
| 2011/0119668 A1 * | 5/2011 | Calder et al. | 718/1 |
| 2011/0179414 A1 * | 7/2011 | Goggin et al. | 718/1 |
| 2011/0184993 A1 * | 7/2011 | Chawla et al. | 707/802 |
| 2011/0185292 A1 * | 7/2011 | Chawla et al. | 715/760 |
| 2011/0185355 A1 * | 7/2011 | Chawla et al. | 718/1 |
| 2012/0005672 A1 * | 1/2012 | Cervantes et al. | 718/1 |
| 2012/0005673 A1 * | 1/2012 | Cervantes et al. | 718/1 |
| 2012/0102487 A1 * | 4/2012 | Cahill et al. | 718/1 |

* cited by examiner

*Primary Examiner* — Dong Kim

(57) ABSTRACT

A computer-implemented method for preserving an independent virtual disk. The method, includes attaching an independent virtual disk to a first virtual machine, and preserving said independent virtual disk when the independent virtual disk is detached from the first virtual machine.

13 Claims, 9 Drawing Sheets

PRESERVING AN INDEPENDENT VIRTUAL DISK

CROSS-REFERENCE TO RELATED U.S. APPLICATIONS

This application is related to U.S. patent application Ser. No. 13/829,914, entitled, "MANAGING AN INDEPENDENT VIRTUAL DISK," by Zheng et al. with filing date Mar. 14, 2013, and assigned to the assignee of the present application.

BACKGROUND

Typically, a virtual disk cannot exist independent of a virtual machine. For example, the virtual disk can only be created when a virtual machine is created or created for a specific virtual machine that already exists. When the virtual machine instance is destroyed, the virtual disk is also destroyed.

Also, typical virtual infrastructure management tools are unable to particularly and individually manage virtual disks at the virtual disk level without requiring burdensome and manual operations.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Preserving an Independent Virtual Disk

Figure 1:
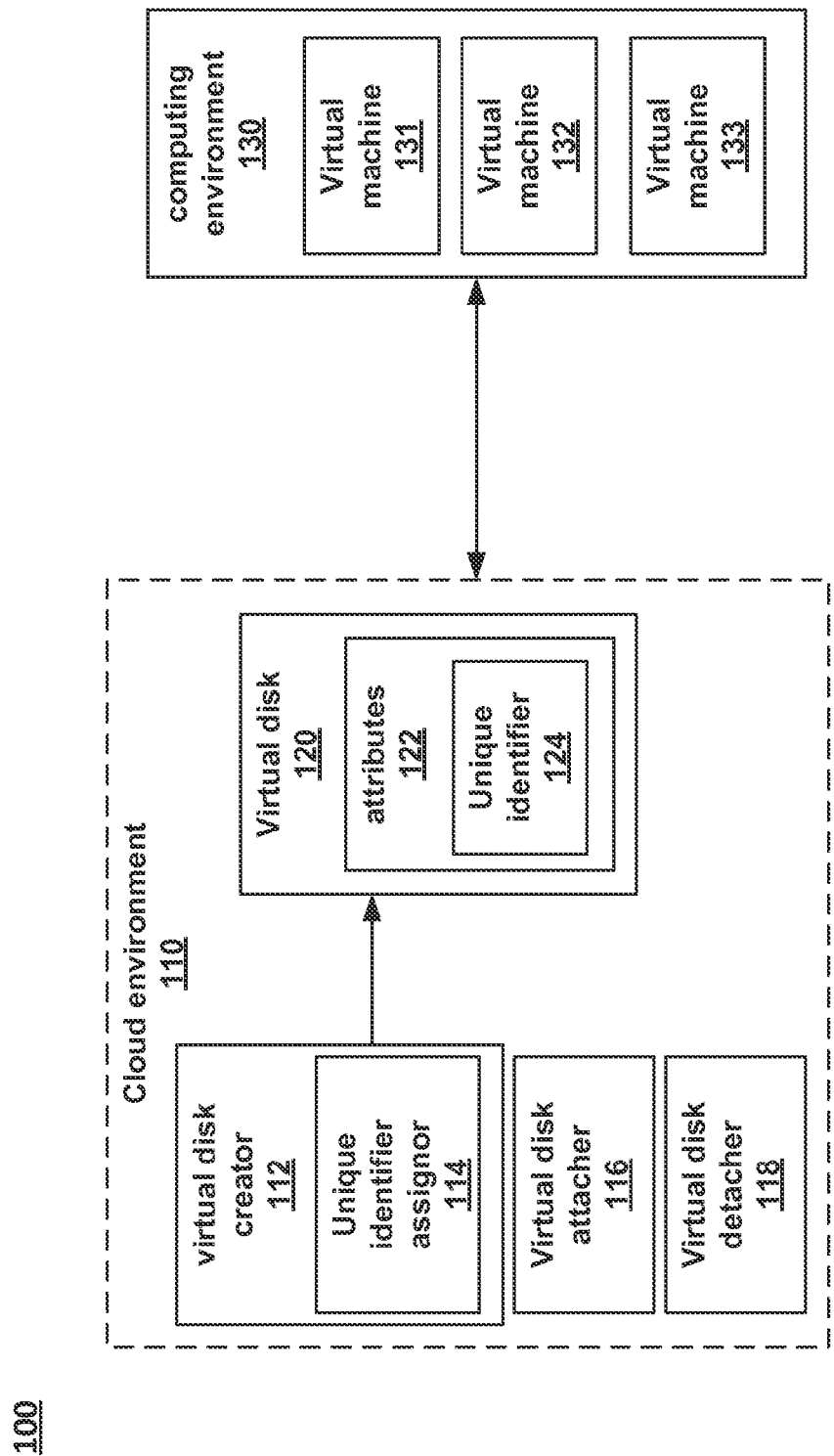
FIG. 1 is a block diagram that illustrates an embodiment of a computing system.

FIG. 1 depicts a block diagram that illustrates an embodiment of computing system 100. Computing system 100 includes, among other things, cloud environment 110 and computing environment 130. In general, computing environment 130 is communicatively coupled to cloud environment 110 and may access functionality of cloud environment 110.

Computing environment 130 includes a plurality of devices. The devices are any number of physical and/or virtual machines, such as virtual machine 131, virtual machine 132 and virtual machine 133. For example, in one embodiment, computing environment 130 is a corporate computing environment that includes tens of thousands of physical and/or virtual machines. It is understood that a virtual machine is implemented on one or some combination of physical machines. It should be appreciated that cloud environment can be communicatively coupled to any number of computing environments.

Virtual machines 131-133 include a variety of applications (e.g., operating system). The virtual devices may have the same installed applications or may have different installed software. The installed software may be one or more software applications from one or more vendors.

Cloud environment 110 is a device comprising at least one processor and memory. As described herein, cloud environment 110 may be located in an Internet connected data center or a private cloud computing center coupled with one or more public and/or private networks. Cloud environment 110 typically couples with a virtual or physical entity in a computing environment (e.g., computing environment 130) through a network connection which may be a public network connection, private network connection, or some combination thereof. For example, a user in computing environment 130 may couple via an Internet connection with cloud environment 110 by accessing a web page or application presented by cloud environment 110 at a virtual or physical entity within computing environment 130.

Cloud environment 110 includes, among other things, virtual disk creator 112 for creating virtual disk 120, virtual disk attacher 116 for attaching virtual disk 120 to virtual machines and virtual disk detacher 118 for detaching virtual disk 120 from virtual machines. In various embodiments, anyone of or combination of virtual disk creator 112, virtual disk attacher 116, and virtual disk detacher 118 may be located in computing environment 130 or any other computing environment.

Virtual Disks

Virtual disk creator 112 generates virtual disk 120. In general, a virtual disk is a virtual logical disk or volume to which a host or application performs I/O operations. It is understood that a virtual disk is implemented on one or some combination of underlying physical entities such as physical storage devices and/or physical memory. A virtual disk is classified as virtual due to the way it is mapped to the physical storage capacity it represents. That is, a virtual disk is typically a file (or a set of logically associated files) containing disk blocks. Accordingly, a virtual disk can be populated with data and used similarly to a physical disk. In one embodiment, virtual disk 120 is created as a first class virtual entity.

Typically, there are internal virtual disks and external virtual disks. Internal virtual disks usually use small computer system interface (SCSI) or integrated development environment (IDE) protocols. External virtual disks usually use plug and play protocols like universal serial bus (USB) or FireWire.

Virtual disk 120 is created with various attributes 122. Attributes 122 define the specifications and characteristics of virtual disk 120. Attributes 122 may be, but are not limited to, name, size, quality, type (e.g., SCSI, IDE), reliability (e.g., redundant array of independent disks (RAID)), read/write capabilities, etc.

Attributes 122 may be generated based on user selection or may be automatically determined based on default values. In one embodiment, the name and size of the virtual disk are provided by a user and the remaining attributes are automatically generated.

In one embodiment, virtual disk 120 is an independent virtual disk. That is, virtual disk 120 is able to be preserved or survive when it is detached from a virtual machine(s) and subsequently attached to another virtual machine(s), which will be described in further detail below.

During creation of virtual disk 120, unique identifier assignor 114 generates unique identifier 124 for virtual disk 120. Unique identifier 124 is independent of virtual machines.

Unique identifier 124 is not associated with and is independent of the data/content that may be stored on the virtual disk. As a result, unique identifier 124 remains the same regardless of changes to the data stored on the virtual disk. Unique identifier 124 is attached to the virtual disk during its entire life span.

Accordingly, virtual disk 120 is an independent virtual disk based on, in part, unique identifier 124 being independent of any virtual machine. Therefore, virtual disk 120, having independent unique identifier 124, survives if and when a virtual machine, that virtual disk 120 is or was attached to, is destroyed.

In one embodiment, unique identifier 124 is a universally unique identifier (UUID).

In various embodiments, disk space is dynamic. That is, the disk space may be dynamically increased or decreased while attached with or detached from a virtual machine.

Moreover, virtual disk 120 may be copied, cloned and directly moved. In regards to cloning, a new virtual disk may be cloned from an already existing object. For example, a user can create a new independent virtual disk by cloning an existing independent virtual disk.

Attaching/Detaching Virtual Disks and Virtual Machines

Virtual disk 120 is able to be attached to one or more plurality of virtual machines. For instance, virtual disk 120 includes data that is desired to be viewed or processed via a virtual machine. Accordingly, virtual disk 120 is attached to the virtual machine such that the virtual machines, alone or in combination, are able to access and use the data on the virtual disk.

In various embodiments, virtual disk 120 is attached to one or more virtual machines. For example, virtual disk 120 is attached to virtual machine 131, via virtual disk attacher 116, such that virtual machine 131 is able to access and process the data stored on virtual disk 120. It should be appreciated that any number of virtual disks may be attached to one or more virtual machines.

In another example, virtual disk 120 is concurrently attached to virtual machines 131-133 such that virtual machines 131-133 are able to share virtual disk 120 and concurrently access and process data on virtual disk 120.

It should be appreciated that virtual disk 120 can be shared among a plurality of virtual machines without requiring use of a network file system (NFS) or a server message block (SMB) through a guest operating system.

Additionally, when virtual disk 120 is attached to a plurality of virtual machines, virtual disk 120 may be exclusively accessed by one virtual machine at a time, or may be accessed by one or more of the attached plurality of virtual machines.

Virtual disk 120 may be detached from virtual machines, for example, by virtual disk detacher 116. For example, virtual disk 120 is initially attached to virtual machine 131 which has an old operating system. As such, virtual disk 120 is detached from virtual machine 131 and virtual disk 120 will be attached to another virtual machine that includes a newer operating system.

In another example, virtual disk 120 is presently attached to a first plurality of virtual machines. Virtual disk 120 may be detached from one or more of the first plurality of virtual machines and reattached to one or more of a second plurality of virtual machines such that the one or more of the second plurality of virtual machines is able to continue using the existing data of virtual disk 120.

Due to virtual disk 120 being set up as an independent virtual disk it may be detached from a virtual machine and continue to exist as an independent entity (even if the virtual machine is subsequently destroyed). After being detached, virtual disk 120 is preserved for a subsequent attachment to other virtual machines.

In one embodiment, while virtual disk 120 is detached from a virtual machine (and not attached to any other virtual machine), virtual disk 120 may be located, for example, in a storage area network (SAN) of a data center. For example, virtual disk 120 may be stored in cloud environment 110, computing environment 130 or any other location that facilitates in the proper storage of virtual disk 120. While virtual disk 120 is stored unique identifier 124 is also kept alive.

Virtual disk 120 is reattached to another virtual machine based on the unique identifier 124. For example, upon reattaching virtual disk 120 to another virtual machine, unique identifier 124 is queried to locate and access virtual disk 120 for attaching to another virtual machine.

The query may be provided by a user. For example, an Information Technology (IT) professional may create a virtual machine (e.g., virtual machine 131) and desires to attach virtual disk 120 to the virtual machine. Accordingly, the IT professional will query for known virtual disk 120 via unique identifier 124 to locate and access virtual disk 120 to attach to the newly created virtual machine.

The query may be provided automatically. For example, when a virtual machine is generated, instruction may be provided such that a virtual disk is queried. Once located, the virtual disk is automatically attached to the newly created virtual machine.

In one embodiment, virtual disk 120 is an independent virtual disk template that can be utilized to create other disks. For example, the new virtual disk, created from the virtual disk template, inherits attributes (e.g., size, locality, etc.) and/or data from the independent virtual disk template. As a result, the new virtual disk can be instantiated from the independent virtual disk template. The independent virtual disk template is able to be managed similarly to the virtual disk 120, as described herein.

Example Methods of Operation

Figure 2:
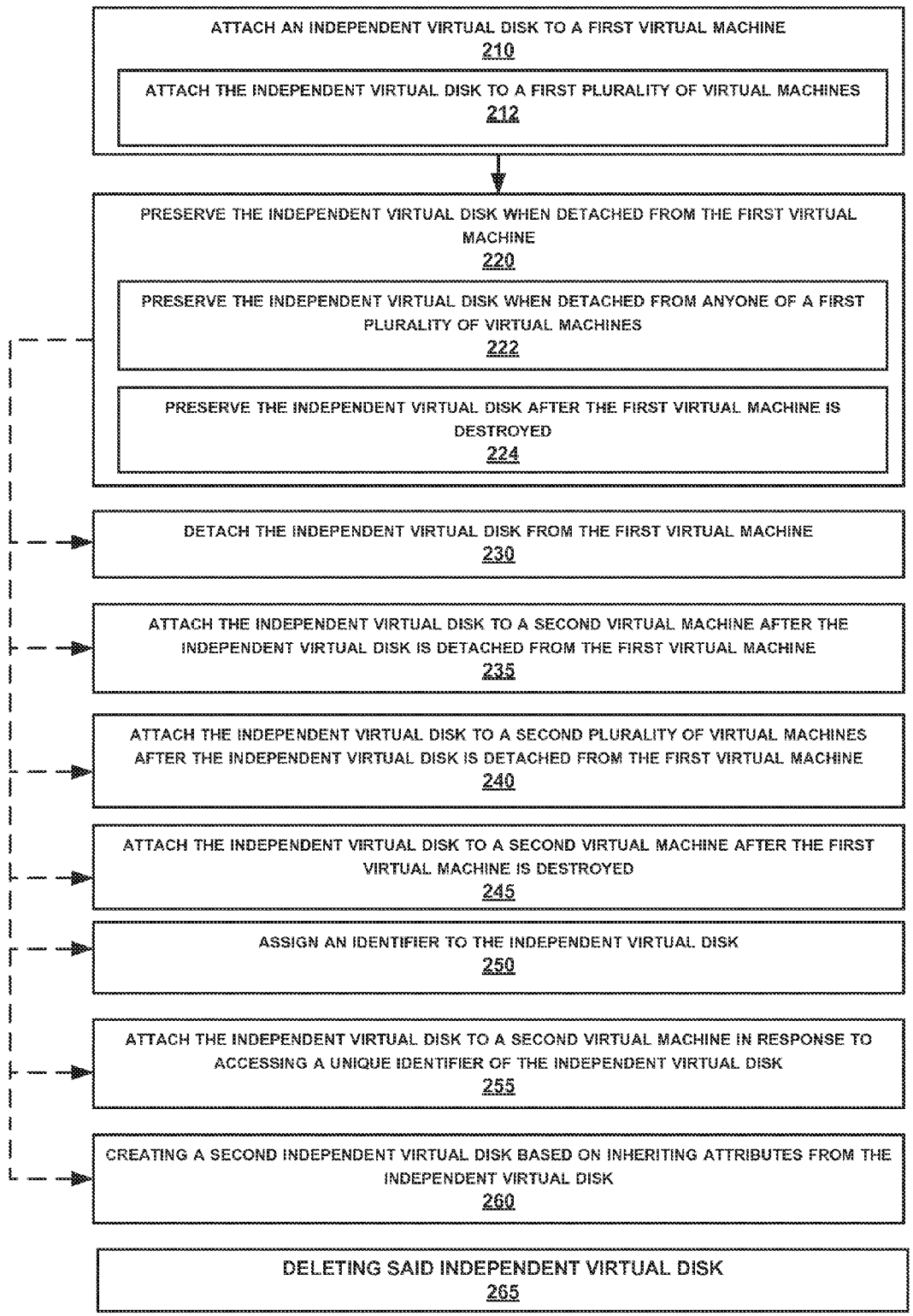
FIG. 2 depicts a method for preserving an independent virtual disk, according to various embodiments.
Figure 3:
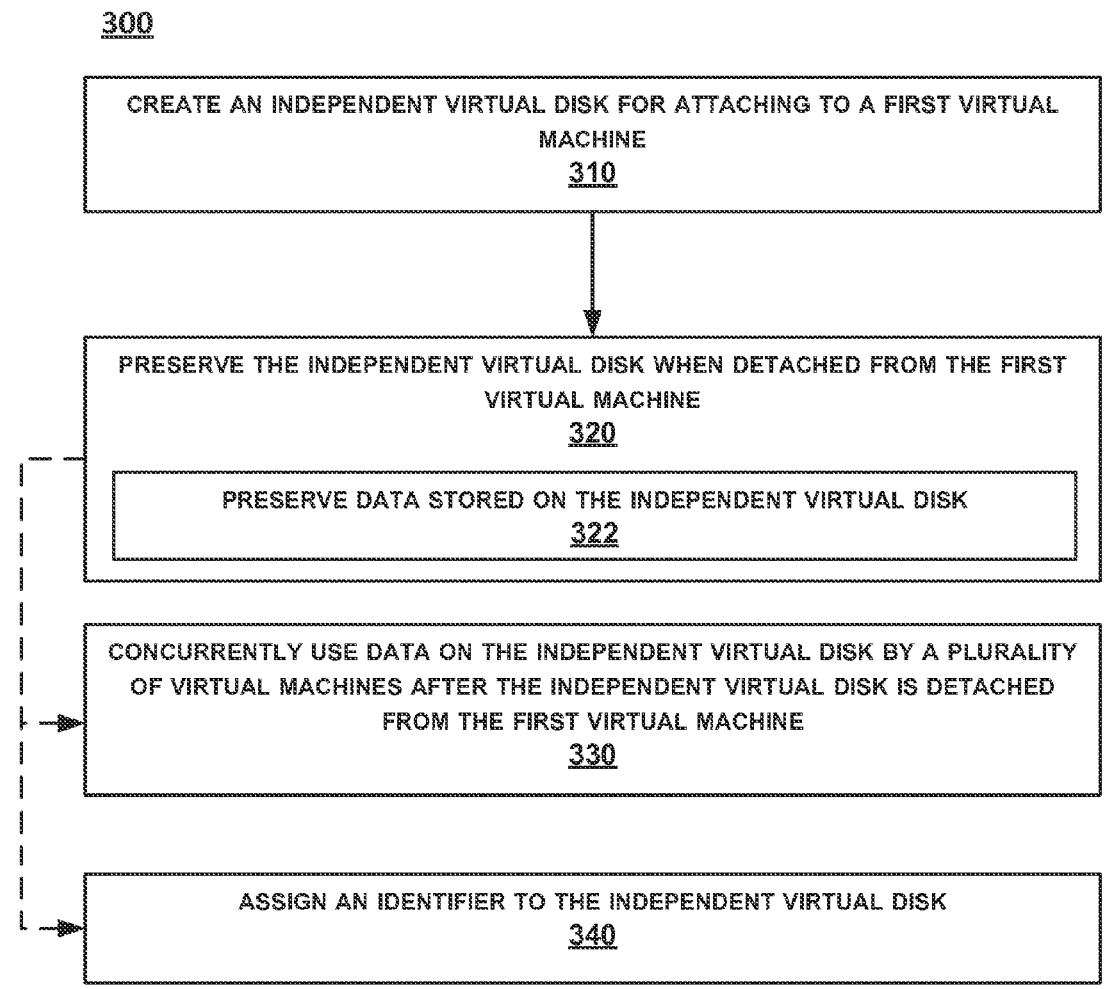
FIG. 3 depicts a method for preserving an independent virtual disk, according to various embodiments.
Figure 4:
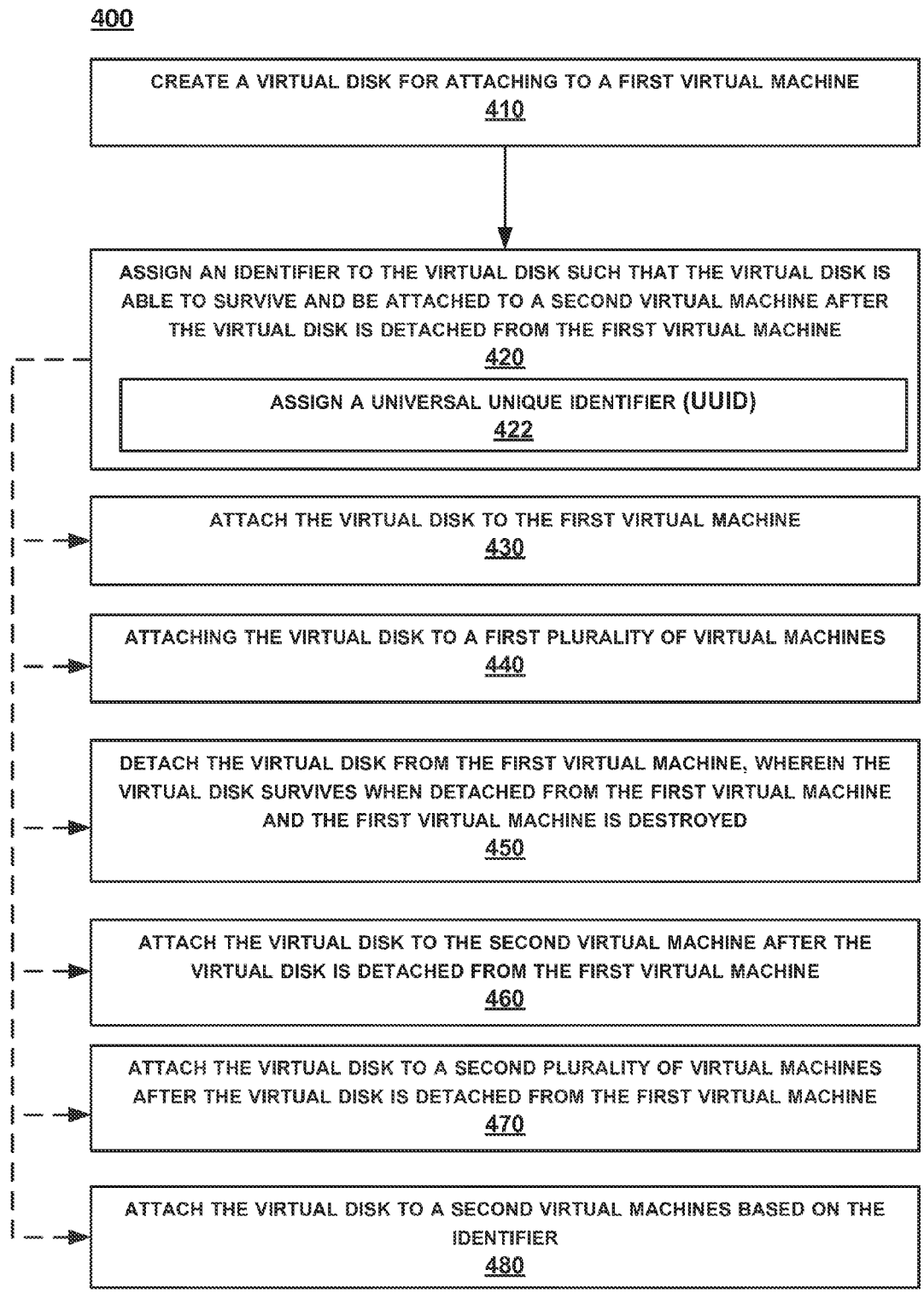
FIG. 4 depicts a method for creating a virtual disk with a unique identifier, according to various embodiments.

The following discussion sets forth in detail the operation of some example methods of operation of embodiments. With reference to FIGS. 2, 3 and 4, flow diagrams 200, 300 and 400 illustrate example procedures used by various embodiments. Flow diagrams 200, 300 and 400 include some procedures that, in various embodiments, are carried out by a processor under the control of computer-readable and computer-executable instructions. In this fashion, procedures described herein and in conjunction with flow diagrams 200, 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. computing environment 130) and/or cloud environments (e.g., cloud environment 110). The computer-readable and computer-executable instructions, which reside on tangible computer readable storage media, are used to control or operate in conjunction with, for example, one or some combination of processors of the computer environments and/or cloud environment 110. It is appreciated that the processor(s) may be physical or virtual or some combination (it should also be appreciated that a virtual processor is implemented on physical hardware). Although specific procedures are disclosed in flow diagrams 200, 300 and/or 400, such procedures are examples. That is, embodiments are well suited to performing various other procedures or variations of the procedures recited in flow diagrams 200, 300 and/or 400. Likewise, in some embodiments, the procedures in flow diagrams 200, 300 and/or 400 may be performed in an order different than presented and/or not all of the procedures described in one or more of these flow diagrams may be performed. It is further appreciated that procedures described in flow diagrams 200, 300 and/or 400 may be implemented in hardware, or a combination of hardware with firmware and/or software.

FIGS. 2 and 3 depict flow diagrams for a method for preserving an independent virtual disk, according to various embodiments.

Referring now to FIG. 2, at 210, an independent virtual disk is attached to a first virtual machine. For example, virtual disk 120, an independent virtual disk, is attached to virtual machine 131. This attachment, in one embodiment, is automatically accomplished by virtual disk attacher 116 of a computing system, such as computing system 100 or 500. For example, upon creation of virtual disk 120 it may be automatically attached. Likewise, upon an instruction to attach virtual disk 120 to virtual machine 131 the attachment may be automatically carried out.

In one embodiment, at 212, the independent virtual disk is attached to a first plurality of virtual machines. For example, virtual disk 120 is attached to virtual machines 131-133. It should be appreciated that a virtual disk can be attached to any number of virtual machines.

At 220, the independent virtual disk is preserved when detached from the first virtual machine. For example, virtual disk 120 is initially attached to virtual machine 131 and subsequently detached from virtual machine 133. While detached from virtual machine 131, virtual disk (and data) is saved such that it is able to be attached to another virtual disk.

The preservation, in one embodiment, is automatically provided in response of virtual disk detacher 118 detaching virtual disk 120 from a virtual machine, wherein virtual disk detacher 118 is part of a computing system, such as computing system 100 or 500. For example, upon detaching of virtual disk 120 it may be automatically preserved. Likewise, upon an instruction to detach virtual disk 120 from virtual machine 131 the preservation may be automatically carried out.

In one embodiment, at 222, the independent virtual disk is preserved when detached from anyone of a first plurality of virtual machines. For example, virtual disk 120 is initially attached to virtual machines 131-133. Virtual disk 120 (and the stored data on the virtual disk) is saved when virtual disk 120 is detached from any one of the virtual machines 131-133.

In a further embodiment, at 224, the independent virtual disk is preserved after the first virtual machine is destroyed. For example, virtual disk 120 is attached to virtual machine 131 and subsequently detached from virtual machine 131 which is then destroyed. Virtual disk 120 is preserved when virtual machine 131 is destroyed because virtual disk 120 is independent of virtual machine 131.

At 230, the independent virtual disk is detached from the first virtual machine. For example, virtual disk 120 is detached from virtual machine 131 wherein virtual disk 120 is preserved and is able to be attached to other virtual machines.

At 235, the independent virtual disk is to a second virtual machine after the independent virtual disk is detached from the first virtual machine. For example, virtual disk 120 is attached to virtual machine 133 after virtual disk 120 is detached from virtual machine 131 which is destroyed.

At 240, the independent virtual disk is attached to a second plurality of virtual machines after the independent virtual disk is detached from the first virtual machine. For example, virtual disk 120 is attached to virtual machines 132 and 133 after virtual disk 120 is detached from virtual machine 131 which is destroyed.

At 245, the independent virtual disk is attached to a second virtual machine after the first virtual machine is destroyed. For example, virtual disk 120 is saved and attached to virtual machine 131 after virtual disk 120 is detached from virtual machine 133.

At 250, an identifier is assigned to the independent virtual disk. For example, unique identifier 124 (e.g., a UUID) is assigned to virtual disk 120 upon creation of the virtual disk.

At 255, the independent virtual disk is attached to a second virtual machine in response to accessing a unique identifier of the independent virtual disk. For example, virtual disk 120 is stored in a data center after being detached from a virtual machine. Virtual disk 120 is accessed by its unique identifier and attached to virtual machine 133 based on the accessing of virtual disk 120 by its unique identifier.

At 260, a second independent virtual disk is created based on inheriting attributes from the independent virtual disk. For example, virtual disk 120 is a template disk. Accordingly, a second independent virtual disk is created by inheriting the attributes of virtual disk 120.

At 265, the independent virtual disk is deleted. For example, virtual disk 120 is attached to a virtual machine. Upon detaching virtual disk 120 from a virtual machine it is destroyed such that it is no longer available to be subsequently attached to other virtual machines.

Moreover, virtual disk 120 may be destroyed independent of destroying a virtual machine that it attaches to. For example, when an independent virtual disk is no longer attached to any virtual machine, a user can destroy the virtual disk identified by the unique identifier, if the virtual disk is no longer needed for future use.

It is noted that any of the procedures, stated above, regarding flow diagram 200 may be implemented in hardware, or a combination of hardware with firmware and/or software. For example, any of the procedures are implemented by a processor(s) of cloud environment 110 and/or computing environment 130.

Referring now to FIG. 3, at 310, an independent virtual disk is created for attaching to a first virtual machine. For example, virtual disk 120 is created by virtual disk creator 112 such that virtual disk 120 is able to be attached to a virtual machine, such as virtual machine 131. The creation, in one embodiment, is automatically provided by virtual disk creator 112 which is part of a computing system, such as computing system 100 or 500.

At 320, the independent virtual disk is preserved when detached from the first virtual machine. For example, virtual disk 120 is initially attached to virtual machine 131 and virtual disk 120 is preserved when detached from virtual machine 131.

At 322, the data stored on the independent virtual disk is preserved. For example, virtual disk 120 (and its data) is independent of a virtual machine such that the disk and data are not destroyed when the virtual disk is detached from the virtual machine and the virtual machine is destroyed.

At 330, data on the independent virtual disk is concurrently used by a plurality of virtual machines after the independent virtual disk is detached from the first virtual machine. For example, an application is stored on virtual disk 120. Virtual disk 120 is subsequently attached to virtual machines 132 and 133 such the virtual machines concurrently access and use the application after virtual disk 120 was detached from virtual machine 131.

At 340, an identifier is assigned to the independent virtual disk. For example, unique identifier 124 (e.g., a UUID) is assigned to virtual disk 120 upon creation of the virtual disk.

It is noted that any of the procedures, stated above, regarding flow diagram 300 may be implemented in hardware, or a combination of hardware with firmware and/or software. For example, any of the procedures are implemented by a processor(s) of cloud environment 110 and/or computing environment 130.

FIG. 4 depicts a flow diagram for a method for creating a virtual disk with a unique identifier, according to various embodiments.

Referring now to FIG. 4, at 410, a virtual disk is created for attaching to a first virtual machine. For example, virtual disk 120, an independent virtual disk, is created by virtual disk creator 112 for subsequent attachment to virtual machine 131. The creation, in one embodiment, is automatically provided by virtual disk creator 112 which is part of a computing system, such as computing system 100 or 500.

At 420, an identifier is assigned to the virtual disk such that the virtual disk is able to survive and be attached to a second virtual machine after the virtual disk is detached from the first virtual machine. For example, unique identifier 124 is assigned to virtual disk 120 such that the virtual disk is able to survive and be attached to another virtual machine after the virtual disk is detached from the first or initial virtual machine.

This assigning, in one embodiment, is automatically accomplished by unique identifier assignor 114 of a computing system, such as computing system 100 or 500. For example, upon creation of virtual disk 120 the unique identifier automatically created and assigned.

At 422, in one embodiment, a UUID is assigned. For example, unique identifier 124 is a UUID.

At 430, the virtual disk is attached to the first virtual machine. For example, virtual disk 120, an independent virtual disk, is attached to virtual machine 131.

At 440, the virtual disk is attached to a first plurality of virtual machines. For example, virtual disk 120 is initially attached to virtual machines 131 and 132.

At 450, the virtual disk is detached from the first virtual machine, wherein the virtual disk survives when detached from the first virtual machine and the first virtual machine is destroyed. For example, virtual disk 120 is detached from virtual machine 131 such that virtual disk 120 survives when it is detached from virtual machine 131 and is destroyed.

At 460, the virtual disk is attached to the second virtual machine after the virtual disk is detached from the first virtual machine. For example, virtual disk 120 is attached to virtual machine 133 after being detached from virtual machine 131.

At 470, the virtual disk is attached to a second plurality of virtual machines after the virtual disk is detached from the first virtual machine. For example, virtual disk 120 is attached to virtual machines 132 and 133 after it has been detached from virtual machine 131.

At 480, the virtual disk is attached to a second virtual machines based on the identifier. For example, virtual disk 120 is stored in a data center after being detached from a virtual machine. Virtual disk 120 is accessed by its unique identifier and attached to virtual machine 133 based on the accessing of virtual disk 120 by its unique identifier.

It is noted that any of the procedures, stated above, regarding flow diagram 400 may be implemented in hardware, or a combination of hardware with firmware and/or software. For example, any of the procedures are implemented by a processor(s) of cloud environment 110 and/or computing environment 130.

Managing an Independent Virtual Disk

Figure 5:
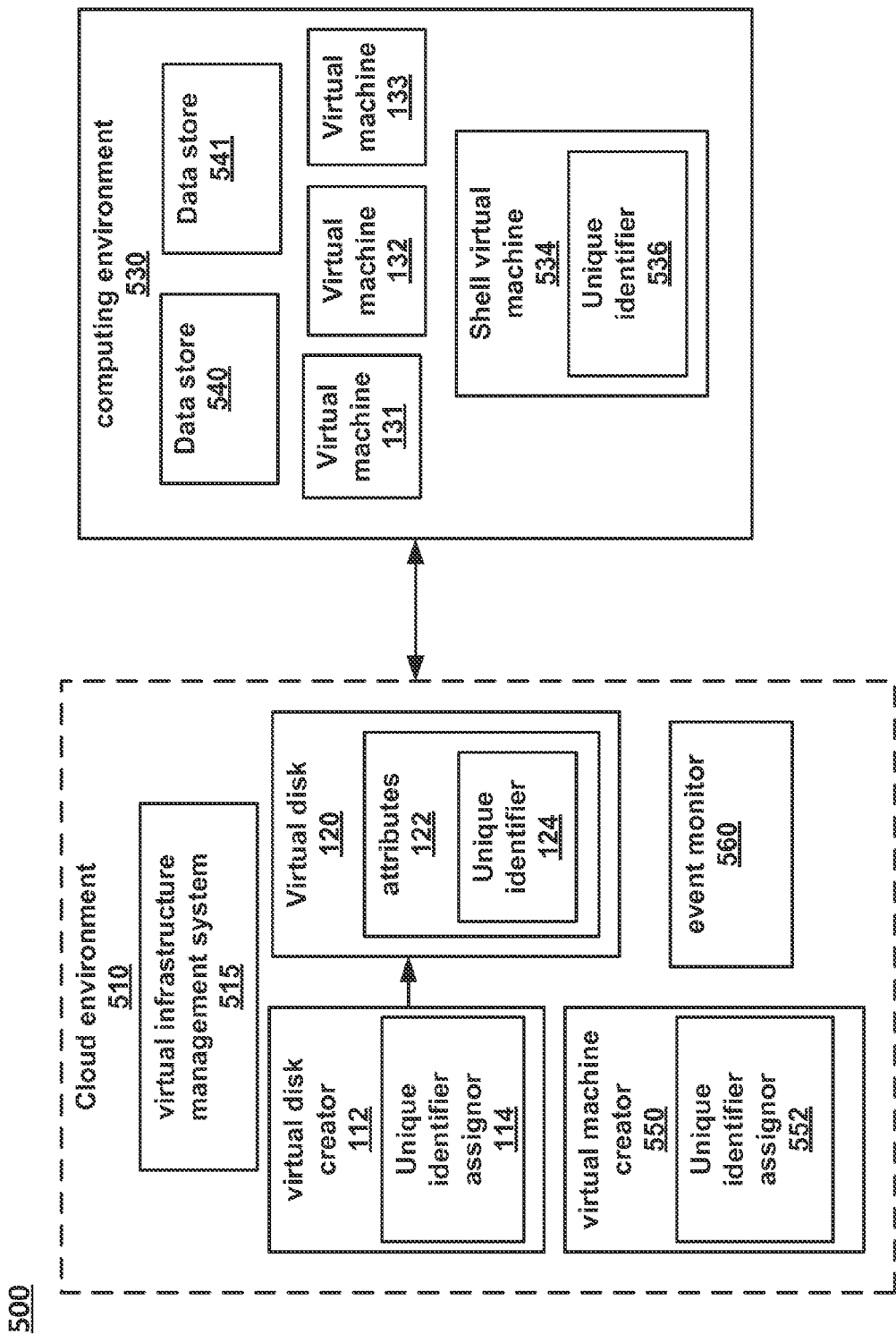
FIG. 5 is a block diagram that illustrates an embodiment of a computing system.

FIG. 5 depicts a block diagram that illustrates an embodiment of computing system 500. Computing system 500 is similar to computing system 100, as described above. That is, computing system 500 functions similarly, in many aspects, as computing system 100.

Computing system 500 includes cloud environment 530 (similar to cloud environment 110) and computing environment 530 (similar to computing environment 130).

Computing environment 530 is managed by virtual infrastructure management system 515. In general, virtual infrastructure management system 515 provides a centralized and extensible platform for managing virtual infrastructure, such as computing environments 130 and 530. For example, virtual infrastructure management system 515 facilitates in provisioning new services, balancing resources, etc.

In various embodiments, virtual infrastructure management system 515 can be, but is not limited to, VMware VCenter Server™, Microsoft System Center Virtual Machine Manager (VMM)™, OpenStack™, etc.

Virtual infrastructure management system 515 may be located in computing environment 530 or cloud environment 510. Moreover, virtual infrastructure management system 515 can facilitate managing a plurality of computing environments.

Virtual infrastructure management system 515 is able to manage an independent virtual disk by way of managing a virtual machine that the independent virtual disk is attached to, which will be described in further detail below.

An independent virtual disk, as described above, is preserved when it is detached from a virtual machine. In other words, an independent virtual disk is a stand-alone virtual disk that is able to survive when it is not attached to a virtual machine.

Typically, the off-the-shelf configuration of a virtual infrastructure management system (e.g., virtual infrastructure management system 515) allows the virtual infrastructure management system to manage a virtual infrastructure at the virtual machine level but not at the virtual disk level. That is, the off-the-shelf configuration allows control and management of virtual machines but does not necessarily allow particular control of stand-alone virtual disks in the computing environment.

In various embodiments, virtual infrastructure management system 515 may be modified to allow particular management and control of virtual disks via management and control of virtual machines. In other words, a stand-alone virtual disk may be managed by leveraging the management of virtual machines supported by typical virtual infrastructure management systems.

In one embodiment, virtual infrastructure management system 515 instructs virtual disk creator 112 to create independent virtual disk 120 in the same fashion as described above. As such, independent virtual disk 120 is a stand-alone virtual disk that is initially unassociated with a virtual machine.

In response to creating an independent virtual disk, virtual machine creator 550 creates a virtual machine. The virtual machine is to attach to or hold stand-alone independent virtual disk 120.

In one embodiment, shell virtual machine 534 is created in response to the creation of an independent virtual disk.

In another embodiment, shell virtual machine 534 is created to hold independent virtual disk 120 such that virtual infrastructure management system 515 is able to manage independent virtual disk 120. Shell virtual machine 534 is not expected to access and process data on independent virtual disk. In contrast, when independent virtual disk 120 is attached to a target virtual machine (e.g., virtual machines 131-133) the target virtual machine accesses and processes data on independent virtual disk.

It should be appreciated that virtual machines (e.g., virtual machines 131-133 and shell virtual machine 534) may be cloned. That is, a new virtual machine may be cloned from an already existing object. For example, a user can create a new virtual machine by cloning an existing virtual machine.

In one embodiment, shell virtual machine 534 is not required to be powered on because it is not required to provide processing functionality as compared to a target virtual machine which does provide processing functionality for data on the independent virtual disk. In order to conserve resources, shell virtual machine 534 may have a minimum configuration of CPU, memory and other non-disk resources such that shell virtual machine 534 is able to be managed by virtual infrastructure management system 515.

Once independent virtual disk 120 is attached to the virtual machine, virtual infrastructure management system 515 is able to manage the virtual machine, and thus the attached independent virtual disk 120. For example, independent virtual disk 120 is attached to shell virtual machine 534, which are both located in data store 540. As such, virtual infrastructure management system 515 may migrate independent virtual disk 120 to data store 541 by leveraging the control functionalities on shell virtual machine 534. That is, virtual infrastructure management system 515 migrates shell virtual machine 534 from data store 540 to data store 541 such that independent virtual disk 120 (which is attached to shell virtual machine 534) is also migrated from data store 540 to data store 541.

In various embodiments, a data store is platform-independent and host-independent. Therefore, data stores do not change when the virtual machines they contain are moved between hosts. The scope of a data store is a datacenter and in some embodiments, the data store is uniquely named within the data center.

If independent virtual disk 120 was not attached to shell virtual machine 534 (or any other virtual machine) virtual infrastructure management system 515 would not be able to particularly control independent virtual disk 120. As a result, for example, virtual infrastructure management system 515 would not be able to migrate independent virtual disk 120 from data store 540 to data store 541 without relying on burdensome and complicated operations, such as manual copying of files, etc.

In one embodiment, independent virtual disk 120 is attached to a target virtual machine (e.g., virtual machines 131-133). Once the user selects the target virtual machine, virtual infrastructure management system 515 will add independent virtual disk 120 to the target virtual machine, for example, by a reconfiguration operation of the target virtual machine. As a result, the control of independent virtual disk 120 is transferred from shell virtual machine 534 to the target virtual machine and shell virtual machine 534 is destroyed because it is no longer holding independent virtual disk 120.

The procedure and/or operation for adding an internal disk may be different than for adding an external disk depending on the underlying virtual infrastructure.

In one embodiment, independent virtual disk 120 is detached from a target virtual machine, for example, virtual machine 131. In such an embodiment, the user (e.g., an IT professional, administrator, etc.) will remove independent virtual disk 120 from the target virtual machine by implementing a reconfiguration operation. Accordingly, in response to the detaching the independent virtual disk from the target virtual machine, another shell virtual machine is generated to hold independent virtual disk 120, as described in further detail above. As a result, the shell virtual machine holds and is able to control the attached independent virtual disk.

The procedure and/or operation for detaching an internal disk may be different than for detaching an external disk depending on the underlying virtual infrastructure.

In various embodiments, virtual infrastructure management system 515 is able to perform a variety of operations on independent virtual disk 120 (e.g., delete, migrate, backup, restore, clone, import, export, etc.) based on performing the operations on a virtual machine (e.g., shell virtual machine 534) that the independent virtual disk 120 is attached to.

In one embodiment, virtual infrastructure management system 515 is able to export an independent virtual disk from a first type of virtual infrastructure (e.g., VMware Virtual Center™) and import the independent virtual disk to a second type of virtual infrastructure (e.g., Microsoft System Center™).

It should be appreciated that virtual infrastructure management system 515 may manage independent virtual disk 120 when it is attached to a virtual machine, as described in detail herein, by not requiring other various operations. For example, migrating independent virtual disk 120 does not require, logging into a host directly and manually copying files. Additionally, a guest OS inside the virtual machine having client software to interact with a network server to access content of independent virtual disk 120 is not required.

Example Methods of Operation

The following discussion sets forth in detail the operation of some example methods of operation of embodiments. With reference to FIGS. 6, 7, 8 and 9, flow diagrams 600, 700, 800 and 900 illustrate example procedures used by various embodiments. Flow diagrams 600, 700, 800 and 900 include some procedures that, in various embodiments, are carried out by a processor under the control of computer-readable and computer-executable instructions. In this fashion, procedures described herein and in conjunction with flow diagrams 600, 700, 800 and 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. computing environment 530) and/or cloud environments (e.g., cloud environments 110 and 510). The computer-readable and computer-executable instructions, which reside on tangible computer readable storage media, are used to control or operate in conjunction with, for example, one or some combination of processors of the computer environments and/or cloud environments 110 and 510. It is appreciated that the processor(s) may be physical or virtual or some combination (it should also be appreciated that a virtual processor is implemented on physical hardware). Although specific procedures are disclosed in flow diagrams 600, 700, 800 and 900, such procedures are examples. That is, embodiments are well suited to performing various other procedures or variations of the procedures recited in flow diagrams 600, 700, 800 and 900. Likewise, in some embodiments, the procedures in flow diagrams 600, 700, 800 and 900 may be performed in an order different than presented and/or not all of the procedures described in one or more of these flow diagrams may be performed. It is further appreciated that procedures described in flow diagrams 600, 700, 800 and 900 may be implemented in hardware, or a combination of hardware with firmware and/or software.

FIGS. 6, 7, 8 and 9 depict flow diagrams for a method for managing an independent virtual disk, according to various embodiments.

Figure 6:
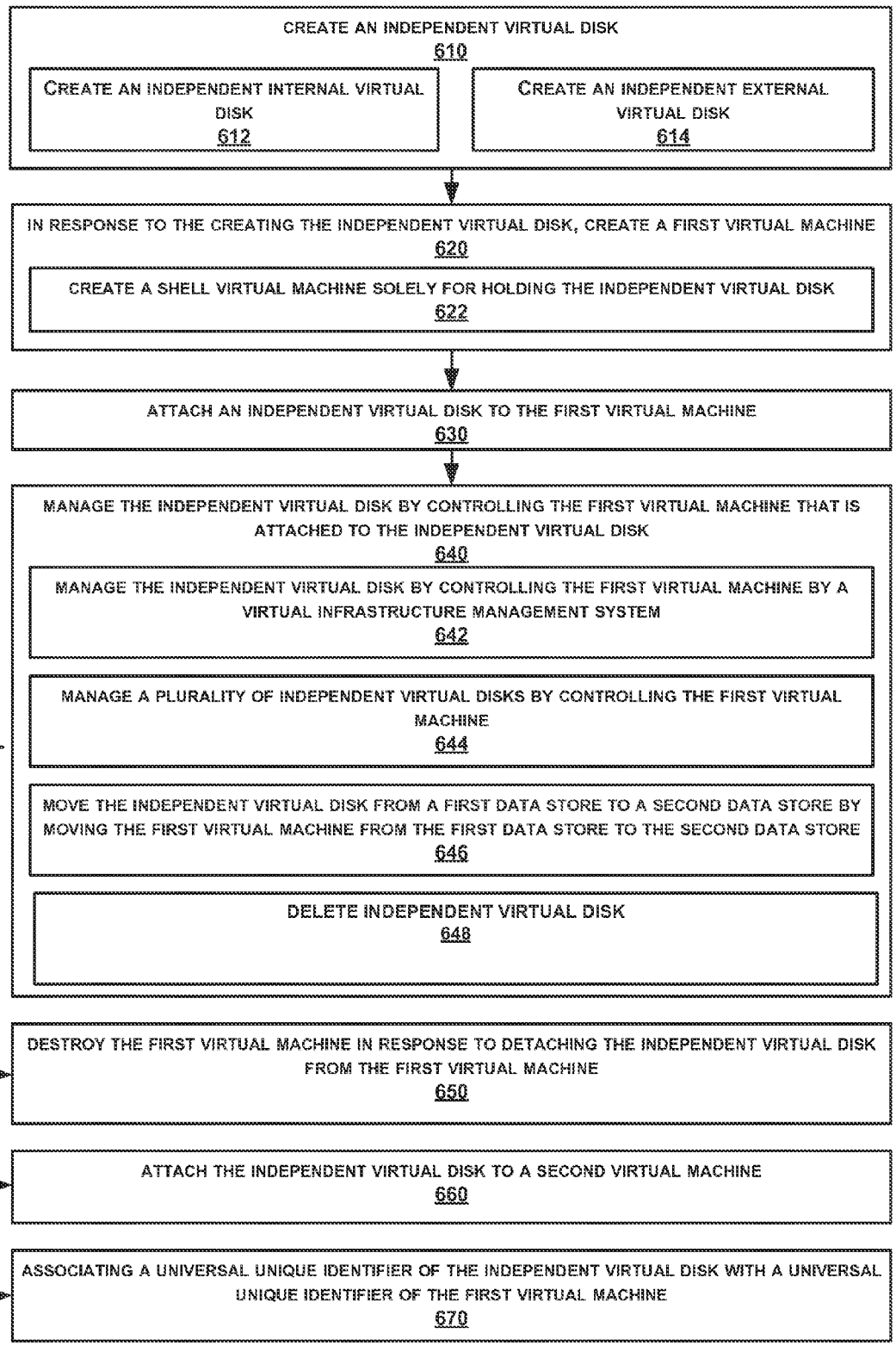
FIG. 6 depicts a method for managing an independent virtual disk, according to various embodiments.

Referring now to FIG. 6, at 610, an independent virtual disk is created. For example, independent virtual disk 120, a stand-alone and independent virtual disk, is created by virtual disk creator 112.

The creation, in one embodiment, is automatically accomplished by virtual disk creator 112 of a computing system, such as computing system 100 or 500. For example, upon instructions, by virtual infrastructure management system 515 to create virtual disk 120, the creation may be automatically carried out.

In various embodiments, virtual infrastructure management system 515 includes a dedicated option to create a standalone disk. The option will be similar to an option to create a virtual disk, however, the user will be provided option particularly relating to the creation of the virtual disk. In one embodiment, various resource selections (e.g., CPU, memory, etc.) will be predetermined based on the underlying virtual infrastructure.

At 612, in one embodiment, an independent internal virtual disk is created. For example, an independent internal virtual disk using a SCSI or IDE protocols is created.

At 614, in another embodiment, an independent external virtual disk is created. For example, an independent internal virtual disk using USB protocols is created.

At 620, a first virtual machine is created in response to the creating of the independent virtual disk. For example, a virtual machine is created, by virtual machine creator 550 in response to the creation of independent virtual disk 120.

The creation of the virtual machine, in one embodiment, is automatically accomplished by virtual machine creator 550 of a computing system, such as computing system 100 or 500. For example, creation of a virtual disk, the creation of the virtual machine is carried out. Also, upon instructions to create a virtual disk, the creation of the virtual machine may be automatically carried out.

At 622, in one embodiment, a shell virtual machine is created solely for holding the independent virtual disk. For example, shell virtual machine 534 is created in response to independent virtual disk 120 being created. Shell virtual machine 534 is created solely for holding independent virtual disk and does not perform any operations outside the scope of holding independent virtual disk 120.

At 630, an independent virtual disk is attached to the first virtual machine. For example, independent virtual disk 120 is attached to shell virtual machine 534. This attachment, in one embodiment, is automatically accomplished by virtual disk attacher 116 of a computing system, such as computing system 100 or 500. For example, upon creation of virtual disk 120 it may be automatically attached. Likewise, upon an instruction to attach virtual disk 120 to virtual machine 131 the attachment may be automatically carried out.

At 640, the independent virtual disk is managed by controlling the first virtual machine that holds the independent virtual disk. For example, virtual infrastructure management system 515 controls shell virtual machine 534. As a result, independent virtual disk 120 (which is attached shell virtual machine 534) is particularly controlled by virtual infrastructure management system 515.

This managing, in one embodiment, may be automatically accomplished by virtual infrastructure management system of a computing system, such as computing system 500.

At 642, in one embodiment, the independent virtual disk is managed by a virtual infrastructure management system that controls the first virtual machine. For example, independent virtual disk 120 is managed by virtual infrastructure management system 515 (e.g., VMware VCenter Server™) that controls shell virtual machine 534.

At 644, in another embodiment, a plurality of independent virtual disks are managed by controlling the first virtual machine. For example, a plurality of independent virtual disks are held by a virtual machine. Accordingly, the plurality of independent virtual disks are managed by virtual infrastructure management system 515 (e.g., VMware VCenter Server™) that controls the virtual machine.

At 646, in a further embodiment, the independent virtual disk is moved from a first data store to a second data store by moving the first virtual machine from the first data store to the second data store. For example, independent virtual disk 120 is migrated from data store 540 to data store 541 by migrating shell virtual machine 534 (which is attached to independent virtual disk 120) from data store 540 to data store 541.

At 648, in another embodiment, the independent virtual disk is deleted. For example, virtual infrastructure management system 515 manages computing environment 530 by deleting virtual disk 120. In such an example, a virtual machine that virtual disk 120 is attached to is destroyed. As a result, virtual disk 120 is also destroyed and is no longer available to be attached to another virtual machine.

Moreover, virtual disk 120 may be destroyed independent of destroying a virtual machine that it attaches to. For example, when an independent virtual disk is no longer attached to any virtual machine, a user can destroy the virtual disk identified by the unique identifier, if the virtual disk is no longer needed for future use.

At 650, the first virtual machine is destroyed in response to detaching the independent virtual disk from the first virtual machine. For example, shell virtual machine 534 is destroyed in response to detaching independent virtual disk 120 from shell virtual machine 534.

At 660, the independent virtual disk is attached to a second virtual machine. For example, after independent virtual disk 120 is detached from shell virtual machine 534, independent virtual disk 120 is attached to a target virtual machine (e.g., virtual machine 131).

At 670, a universal unique identifier of the independent virtual disk is associated with a universal unique identifier of the first virtual machine. For example, unique identifier assignor 552 assigns unique identifier 536 (e.g., UUID) to shell virtual machine 534. For independent virtual disk 120 to be properly associated and attached to shell virtual machine 534 such that independent virtual disk 120 is able to be managed via shell virtual machine 534, unique identifier 124 of independent virtual disk 120 is associated with unique identifier 536 of shell virtual machine.

It is noted that any of the procedures, stated above, regarding flow diagram 600 may be implemented in hardware, or a combination of hardware with firmware and/or software. For example, any of the procedures are implemented by a processor(s) of cloud environment 110 and/or computing environment 530.

Figure 7:
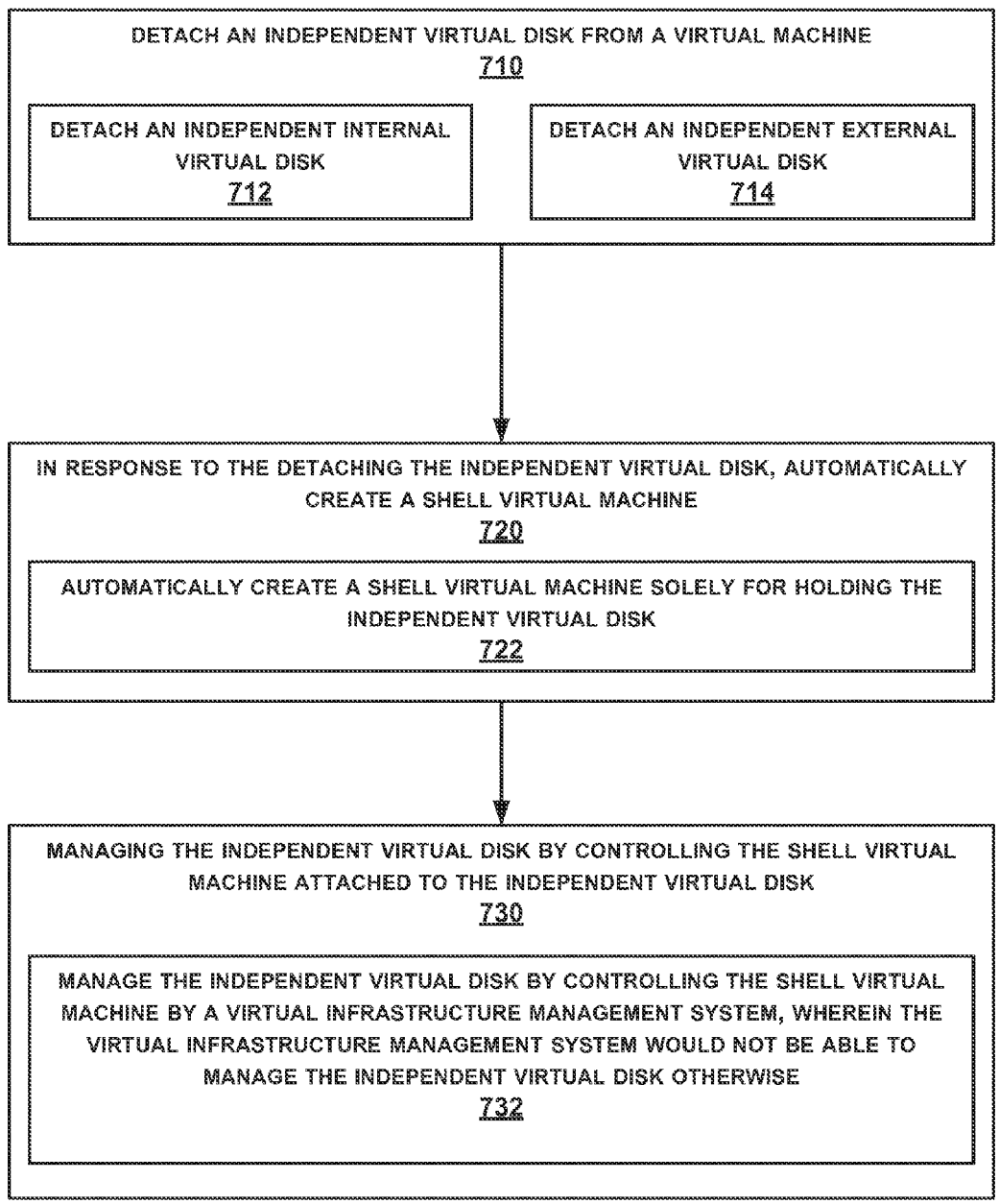
FIG. 7 depicts a method for managing an independent virtual disk, according to various embodiments.

Referring now to FIG. 7, at 710, an independent virtual disk is detached from a virtual machine. For example, independent virtual disk 120 is detached from a target virtual machine (e.g., virtual machine 131) such that it is a stand-alone independent virtual disk.

This detachment, in one embodiment, is automatically accomplished by a virtual disk detacher (e.g., virtual disk detacher 116) of a computing system, such as computing system 100 or 500. For example, upon creation of a virtual machine, virtual disk 120 may be automatically detached from another virtual machine. Likewise, upon an instruction to detach virtual disk 120 from virtual machine 131 the detachment may be automatically carried out.

At 712, in one embodiment, an independent internal virtual disk is detached from a virtual machine. For example, an independent internal virtual disk using a SCSI or IDE protocols is detached from virtual machine 131.

At 714, in another embodiment, an independent external virtual disk is detached from a virtual machine. For example, an independent internal virtual disk using USB protocols is detached from virtual machine 131.

At 720, automatically a shell virtual machine is automatically created in response to the detaching the independent virtual disk. For example, shell virtual machine 534 is automatically created in response to independent virtual disk 120 being detached from a target virtual machine.

This creation, in one embodiment, is automatically accomplished by virtual disk creator 112 of a computing system, such as computing system 100 or 500. For example, upon detachment of virtual disk 120, the virtual machine may be automatically created. Likewise, upon an instruction to detach virtual disk 120 from virtual machine 131 the creation of another virtual machine may be automatically carried out.

At 722, in one embodiment, a shell virtual machine is automatically created solely for holding the independent virtual disk. For example, shell virtual machine 534 is automatically created in response to independent virtual disk 120 being detached from a target virtual machine, wherein shell virtual machine 534 is solely used for holding independent virtual disk 120 when it is not attached to a target virtual machine.

At 730, the independent virtual disk is managed by controlling the shell virtual machine attached to the independent virtual disk. For example, virtual infrastructure management system 515 controls shell virtual machine 534. As a result, independent virtual disk 120 (which is attached shell virtual machine 534) is particularly controlled, at the virtual disk level, by virtual infrastructure management system 515. This managing, in one embodiment, may be automatically accomplished by virtual infrastructure management system of a computing system, such as computing system 500.

At 732, in one embodiment, the independent virtual disk is managed by a virtual infrastructure management system that controls the shell virtual machine, wherein the virtual infrastructure management system would not be able to manage the independent virtual disk otherwise. For example, independent virtual disk 120 (which is attached shell virtual machine 534) is particularly controlled by virtual infrastructure management system 515. However, if independent virtual disk 120 were not attached to virtual machine (e.g., shell virtual machine 534) virtual infrastructure management system 515 would not have the capabilities to particularly access and control/manage independent virtual disk 120.

It is noted that any of the procedures, stated above, regarding flow diagram 700 may be implemented in hardware, or a combination of hardware with firmware and/or software. For example, any of the procedures are implemented by a processor(s) of cloud environment 110 and/or computing environment 530.

Figure 8:
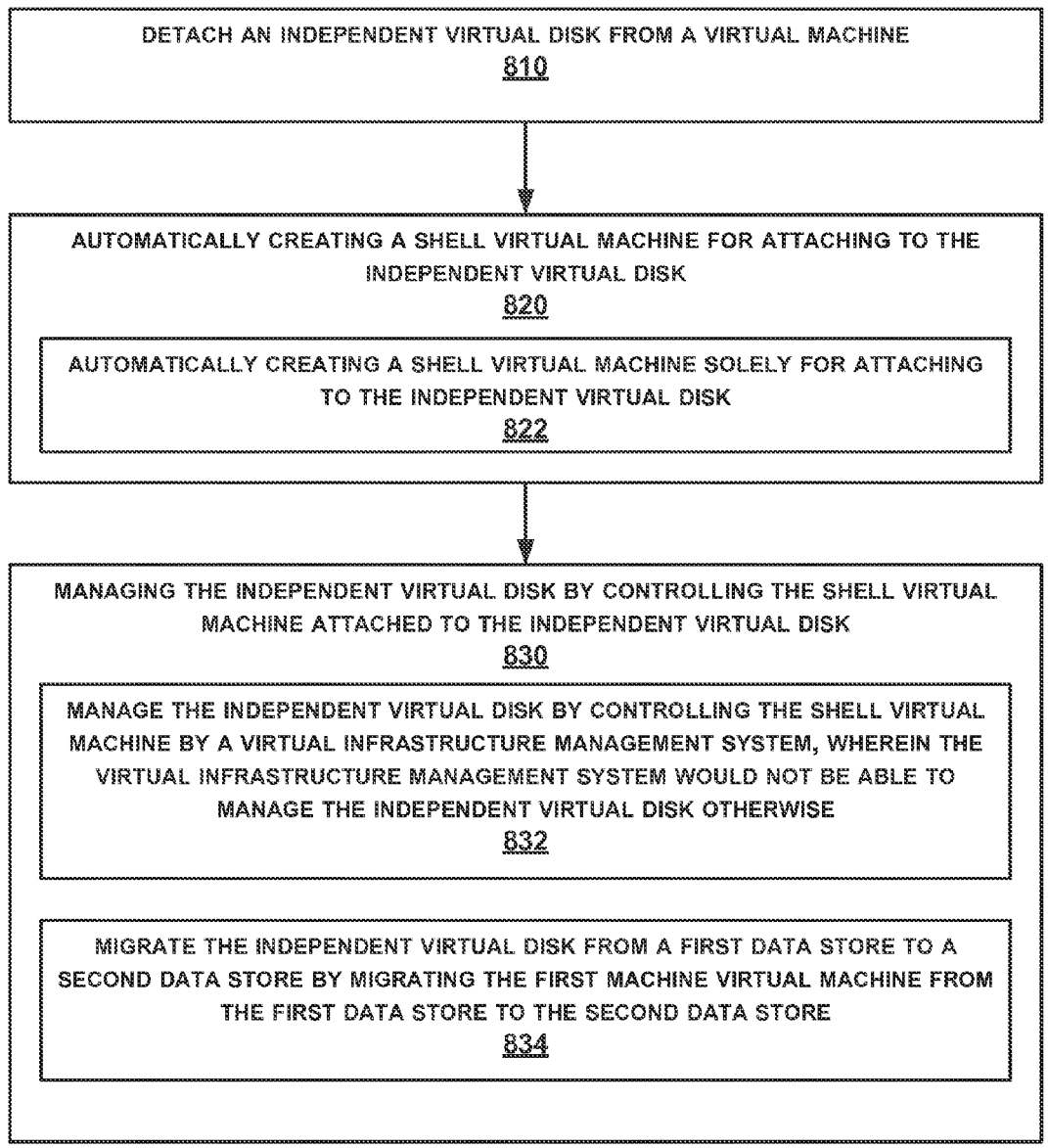
FIG. 8 depicts a method for managing an independent virtual disk, according to various embodiments.

Referring now to FIG. 8, at 810, an independent virtual disk is detached from a virtual machine. For example, independent virtual disk 120 is detached from a target virtual machine (e.g., virtual machine 131) such that it is a stand-alone independent virtual disk. This detachment, in one embodiment, is automatically accomplished by a virtual disk detacher (e.g., virtual disk detacher 116) of a computing system, such as computing system 100 or 500. For example, upon creation of a virtual machine, virtual disk 120 may be automatically detached from another virtual machine. Likewise, upon an instruction to detach virtual disk 120 from virtual machine 131 the detachment may be automatically carried out.

At 820, a shell virtual machine is automatically created for attaching to the independent virtual disk. For example, shell virtual machine 534 is automatically created in response to independent virtual disk 120 being detached from a target virtual machine. This creation, in one embodiment, is automatically accomplished by virtual disk creator 112 of a computing system, such as computing system 100 or 500. For example, upon detachment of virtual disk 120, the virtual machine may be automatically created. Likewise, upon an instruction to detach virtual disk 120 from virtual machine 131 the creation of another virtual machine may be automatically carried out.

At 822, in one embodiment, a shell virtual machine is automatically created solely for attaching to the independent virtual disk. For example, shell virtual machine 534 is created for the sole purpose of holding independent virtual disk 120 such that independent virtual disk 120 may be particularly managed by virtual infrastructure management system 515.

At 830, the independent virtual disk is managed by controlling the shell virtual machine attached to the independent virtual disk. For example, virtual infrastructure management system 515 controls shell virtual machine 534. As a result, independent virtual disk 120 (which is attached shell virtual machine 534) is particularly controlled, at the virtual disk level, by virtual infrastructure management system 515. This managing, in one embodiment, may be automatically accomplished by virtual infrastructure management system of a computing system, such as computing system 500.

At 832, in one embodiment, the independent virtual disk is managed by a virtual infrastructure management system that controls the shell virtual machine, wherein the virtual infrastructure management system would not be able to manage the independent virtual disk otherwise. For example, independent virtual disk 120 (which is attached shell virtual machine 534) is particularly controlled by virtual infrastructure management system 515. However, if independent virtual disk 120 were not attached to virtual machine (e.g., shell virtual machine 534) virtual infrastructure management system 515 would not have the capabilities to particularly access and control/manage independent virtual disk 120.

At 834, in another embodiment, the independent virtual disk is migrated from a first data store to a second data store by migrating the first virtual machine from the first data store to the second data store. For example, independent virtual disk 120 is migrated from data store 540 to data store 541 by migrating shell virtual machine 534 (which is attached to independent virtual disk 120) from data store 540 to data store 541.

It is noted that any of the procedures, stated above, regarding flow diagram 800 may be implemented in hardware, or a combination of hardware with firmware and/or software. For example, any of the procedures are implemented by a processor(s) of cloud environment 110 and/or computing environment 530.

Figure 9:
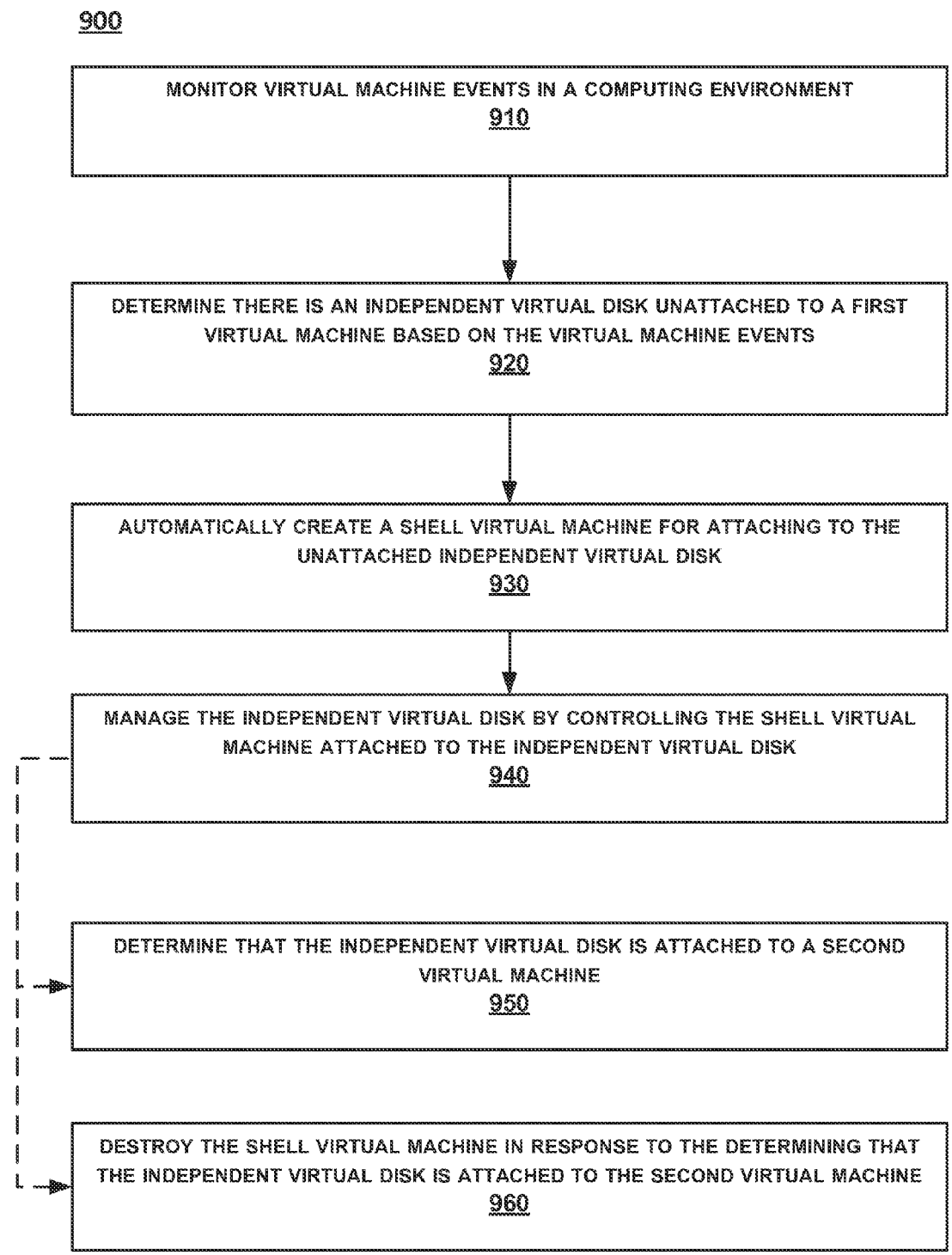
FIG. 9 depicts a method for managing an independent virtual disk, according to various embodiments.

Referring now to FIG. 9, at 910, virtual machine events are monitored in a computing environment. For example, event monitor 560 is a component that monitors events in computing environment 530 and provides notifications of such events. The events can be any event that is capable of being monitored, for example, virtual machine reconfiguration or changes. The monitoring, in one embodiment, is automatically accomplished by event monitor 560 of a computing system, such as computing system 500.

In another example, if a virtual disk is removed from a virtual machine, a notification is provided that there is a stand-alone virtual disk.

At 920, it is determined that an independent virtual disk is unattached to a first virtual machine based on the virtual machine events. For example, event monitor 560 monitors virtual machine 131 is reconfigured and independent virtual disk 120 is removed from virtual machine 131. Therefore, it is determined that independent virtual disk 120 is unattached.

The determining, in one embodiment, is automatically accomplished by utilization of event monitor 560 of a computing system, such as computing system 500. For example, upon an instruction to monitor a computing environment for changes to virtual machines the determination may be automatically carried out.

At 930, a shell virtual machine is automatically created for attaching to the independent virtual disk. For example, shell virtual machine 534 is automatically created in response to independent virtual disk 120 being detached from a target virtual machine. This creation, in one embodiment, is automatically accomplished by virtual disk creator 112 of a computing system, such as computing system 100 or 500.

At 940, the independent virtual disk is managed by controlling the shell virtual machine attached to the independent virtual disk. For example, virtual infrastructure management system 515 controls shell virtual machine 534. As a result, independent virtual disk 120 (which is attached shell virtual machine 534) is particularly controlled, at the virtual disk level, by virtual infrastructure management system 515. This managing, in one embodiment, may be automatically accomplished by virtual infrastructure management system of a computing system, such as computing system 500.

At 950, it is determined that the independent virtual disk is attached to a second virtual machine. For example, event monitor 560 detects that independent virtual disk is reattached to virtual machine 132.

At 960, the shell virtual machine is destroyed in response to determining that the independent virtual disk is attached to the second virtual machine. For example, shell virtual machine 534 is automatically destroyed in response to determining that independent virtual disk 120 is attached to virtual machine 133.

It is noted that any of the procedures, stated above, regarding flow diagram 900 may be implemented in hardware, or a combination of hardware with firmware and/or software. For example, any of the procedures are implemented by a processor(s) of cloud environment 110 and/or computing environment 530.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A computer-implemented method for preserving an independent virtual disk, said computer-implemented method comprising:
    creating a shell virtual machine;
    creating an independent virtual disk wherein said independent virtual disk is held by said shell virtual machine which does not access and process data related to said independent virtual disk;
    assigning an unique identifier to said independent virtual disk such that said independent virtual disk is able to survive after said independent virtual disk is detached from said shell virtual machine;

detaching said independent virtual disk from said shell virtual machine;

attaching said independent virtual disk to a first virtual machine of a plurality of virtual machines;

preserving said independent virtual disk in response to said independent virtual disk being detached from said first virtual machine; and attaching said independent virtual disk to a second virtual machine.

2. The computer-implemented method as recited in claim 1, wherein said attaching an independent virtual disk to a first virtual machine further comprises:

attaching said independent virtual disk to a first plurality of virtual machines.

3. The computer-implemented method as recited in claim 1, wherein said preserving said independent virtual disk when detached from said first virtual machine further comprises:

preserving said independent virtual disk when detached from one of a first plurality of virtual machines.

4. The computer-implemented method as recited in claim 1, wherein said preserving said independent virtual disk when detached from said first virtual machine further comprises:

preserving said independent virtual disk after said first virtual machine is destroyed.

5. The computer-implemented method as recited in claim 1, wherein said attaching said independent virtual disk to a second virtual machine further comprises:

attaching said independent virtual disk to a second plurality of virtual machines after said independent virtual disk is detached from said first virtual machine.

6. The computer-implemented method as recited in claim 1, wherein said attaching said independent virtual disk to a second virtual machine further comprises:

attaching said independent virtual disk to said second virtual machine after said first virtual machine is destroyed.

7. The computer-implemented method as recited in claim 1, further comprising:

attaching said independent virtual disk to said second virtual machine in response to accessing said unique identifier of said independent virtual disk.

8. The computer-implemented method as recited in claim 1, further comprising:

creating a second independent virtual disk based on inheriting attributes from said independent virtual disk.

9. The computer-implemented method as recited in claim 1, further comprising:

deleting said independent virtual disk.

10. A non-transitory computer-readable storage medium having instructions embodied therein when executed cause a computer system to perform a method for preserving an independent virtual disk, said method comprising:

creating a shell virtual machine;

creating an independent virtual disk wherein said independent virtual disk is held by said shell virtual machine which does not access and process data related to said independent virtual disk;

assigning an unique identifier to said independent virtual disk such that said independent virtual disk is able to survive after said independent virtual disk is detached from said shell virtual machine;

preserving said independent virtual disk in response to said independent virtual disk being detached from said first virtual machine; and attaching said independent virtual disk to a second virtual machine of said plurality of virtual machines.

11. The non-transitory computer-readable storage medium of claim 10, wherein said preserving said independent virtual disk further comprises:

preserving data stored on said independent virtual disk.

12. The non-transitory computer-readable storage medium of claim 10, further comprising:

concurrently using data on said independent virtual disk by the plurality of virtual machines after said independent virtual disk is detached from said first virtual machine.

13. The non-transitory computer-readable storage medium of claim 10, further comprising:

storing said independent virtual disk based on a said unique identifier.

* * * * *